(12) United States Patent
Chang et al.

(10) Patent No.: US 7,580,918 B2
(45) Date of Patent: Aug. 25, 2009

(54) SYSTEM AND METHOD OF EFFICIENTLY REPRESENTING AND SEARCHING DIRECTED ACYCLIC GRAPH STRUCTURES IN DATABASES

(75) Inventors: Walter Chang, San Jose, CA (US); Nadia Ghamrawi, San Jose, CA (US); Arun Swami, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 304 days.

(21) Appl. No.: 11/433,139

(22) Filed: May 11, 2006

(65) Prior Publication Data
US 2007/0208693 A1 Sep. 6, 2007

Related U.S. Application Data

(60) Provisional application No. 60/778,869, filed on Mar. 3, 2006.

(51) Int. Cl.
G06F 7/00 (2006.01)
(52) U.S. Cl. ......................................................... 707/2
(58) Field of Classification Search .................... 707/2
See application file for complete search history.

(56) References Cited

U.S. PATENT DOCUMENTS 7,165,058 B2 * 1/2007 Coen .............................. 707/1

2003/0120642 A1 * 6/2003 Egilsson et al. ................ 707/3
2005/0257194 A1 * 11/2005 Morrow et al. ............... 717/109
2006/0123009 A1 * 6/2006 Bruno et al. ................... 707/10

FOREIGN PATENT DOCUMENTS

EP 1156432 11/2001

OTHER PUBLICATIONS

Schmidt, Axel "PCT International Search Report and Written Opinion for PCT/US2007/063105", mailed Jul. 6, 2007 and to be published by USPTO, 8 pages.
"About WordNet". Retrieved from the Internet: <URL: http://wordnet.princeton.edu>, 2 pages (accessed on Jan. 21, 2006).

(Continued)

Primary Examiner—Charles Rones
Assistant Examiner—Fazlul Quader
(74) Attorney, Agent, or Firm—Fish & Richardson P.C.

(57) ABSTRACT

The present disclosure includes systems and techniques relating to representation and retrieval of data structures in databases. In general, embodiments of the invention feature a computer program product and a method including storing a generalized directed acyclic graph (DAG) in a database, wherein the storing includes encoding path information of the generalized DAG in entries of a path table in the database, the encoding includes converting the path information into text strings, and the entries of the path table correspond to paths in the generalized DAG from nodes of the generalized DAG to a root node of the generalized DAG; triggering generation of a lexical index of the path table using the text strings, wherein the lexical index separately lists tokens included in the entries; and retrieving one or more portions of the generalized DAG from the database for in-memory operations.

25 Claims, 5 Drawing Sheets

OTHER PUBLICATIONS

Agirre, Eneko et al., "Enriching very large ontologies using the WWW", in Proceedings of the Ontology Learning Workshop, ECAI, Berlin, Germany, 2000. Retrieved from the Internet: <URL: http://citeseer.ist.psu.edu/agirre00enriching.html>, 6 pages (accessed Dec. 20, 2005).

Berka, Petr et al., "Discretization and grouping: preprocessing steps for Data Mining", Principles of Data Mining and Knowledge Discovery. LNAI 1510. Springer, 1998. Retrieved from the Internet: <URL: http://citeseer.ist.psu.edu/berka98discretization.html>, 7 pages (accessed onDec. 20, 2005).

Bisson, Gilles et al., "Designing clustering methods for ontology building: The Mo'K workbench", in Proceedings of the ECAI Ontology Learning Workshop, Berlin, Aug. 2000, Staab, S. and Maedche, A. and Nedellec C., (Eds.). Retrieved from the Internet: <URL:http://citeseer.ist.psu.edu/bisson00designing.html>, 6 pages (accessed on Dec. 20, 2005).

"The Boost Graph Library (BGL)". Retrieved from the Internet: <URL: http://boost.org/libs/graph/doc/>, 4 pages (accessed on Jun. 2, 2006).

Celko, Joe. "Graphs, Trees, and Hierarchies", Trees and Hierarchies in SQL for Smarties. Retrieved from the Internet: <URL: http://www.dbazine.com/ofinterest/oi-articles/celko24>, 10 pages (accessed on Jun. 2, 2006).

Cimiano, Philipp et al., "Conceptual Knowledge Processing With Formal Concept Analysis and Ontologies", in Concept Lattices: Second International Conference on Formal Concept Analysis, ICFCA 2004 Sydney, Australia, Feb. 23-26, 2004 Proceedings. Retrieved from the Internet: <URL: http://www.aifb.uni-karlsruhe.de/WBS/pci/icfca04.pdf>, 18 pages (accessed onDec. 20, 2005).

Dougherty, James et al., "Supervised and Unsupervised Discretization of Continuous Features", in Proceedings of the Twelfth International Conference on Machine Learning, Tahoe City, CA, 1995. Retrieved from the Internet: <URL: http://citeseer.ist.psu.edu/dougherty95supervised.html>, 9 pages (accessed on Dec. 19, 2005).

Faure, David et al., "A Corpus-based Conceptual Clustering Method for Verb Frames and Ontology Acquisition", in LREC workshop on Adapting lexical and corpus resources to sublanguages and applications, Granada, Spain, May 1998. Retrieved from the Internet: <URL: http://citeseer.ist.psu.edu/faure98corpusbased.html>, 8 pages (accessed on Dec. 19, 2005).

Fayyad, Usama et al., "Multi-Interval Discretization of Continuous-Valued Attributes for Classification Learning", in Proceedings of the 13th International Joint Conference on Artificial Intelligence, vol. 2, pp. 1022-1027 (1993).

Holte, Robert C., "Very Simple Classification Rules Perform Well on Most Commonly Used Datasets", Machine Learning, 11:63-91 (1993).

ISO 2788:1986, "Documentation—Guidelines for the establishment and development of monolingual thesauri". Retrieved from the Internet: <URL: http://www.collectionscanada.ca/iso/tc46sc9/standard/2788e.html>, 5 pages (accessed on Feb. 21, 2006).

Liu, Huan et al., "Chi2: Feature Selection and Discretization of Numeric Attributes", in Proceedings of 7th IEEE International Conference on Tools with Artificial Intelligence, 1995. Retrieved from the Internet: <URL: http://citeseer.ist.psu.edu/liu95chi.html>, 4 pages (accessed on Dec. 19, 2005).

Maedche, Alexander et al., "Discovering Conceptual Relations From Text", Technical Report 399, Institute AIFB, Karlsruhe University, 2000. Retrieved from the Internet: <URL: http://citeseer.ist.psu.edu/maedche00discovering.html>, 5 pages (accessed on Dec. 20, 2005).

McGregor, Colin. "Oracle Text Application Developer's Guide Release 9.2", Mar. 2002. Retrieved from the Internet: <http://www.utexas.edu/its/unix/reference/oracledocs/v92/B10501_01/text.920/a96517/toc.htm>, 220 pages (accessed on Feb. 21, 2006).

National Information Standards Organization (NISO), "Guidelines for the Construction, Format, and Management of Monolingual Thesauri", pp. 1-60 (1994).

Niedermayer, Daryle. "An Introduction to Bayesian Networks and their Contemporary Applications", Dec. 1998. Retrieved from the Internet: <URL: http://www.niedermayer.ca/papers/bayesian>, 17 pages (accessed on Jan. 19, 2006).

OWL Web Ontology Language Overview, D.L. McGuinness and F. van Harmelen (Eds.). W3C Recommendation Feb. 10, 2004. Retrieved from the Internet: <URL: http://www.w3.org/TR/owl-features/>, 15 pages (accessed on Feb. 21, 2006).

Papadimitriou, Christos H. et al., "Latent Semantic Indexing: A Probabilistic Analysis", in Proceedings of the ACM Conference on Principles of Database Systems (PODS), Seattle (to appear), 1998. Retrieved from the Internet: <URL: http://citeseer.ist.psu.edu/article/papadimitriou97latent.html>, 21 pages (accessed on Jan. 18, 2006).

Pereira, Fernando et al., "Distributional Clustering of English Words" (1994); 30th Annual Meeting of the ACL. Retrieved from the Internet: <URL:http://citeseer.ist.psu.edu/pereira93distributional.html>, 9 pages (accessed on Dec. 20, 2005).

Perner, Petra et al., "Multi-Interval Discretization Methods for Decision Tree Learning", Advances in Pattern Recognition, A. Amin, D. Dori, P. Pudil, and H. Freeman (Eds.), LNCS 1451, Springer Verlag, pp. 475-482 (1998).

Quinlan, J.R., "Simplifying Decision Trees", AI Memo No. 930, Massachusetts Institute of Technology Artificial Intelligence Laboratory, pp. 1-16, Dec. 1986.

Quinlan, J.R., "Induction of Decision Trees", Machine Learning, 1: 81-106 (1986).

Ratanamahatana, Chotirat Ann, "CloNI: Clustering of $\sqrt{N}$—Interval discretization", in Proceedings of the 4th International Conference on Data Mining Including Building Application for CRM & Competitive Intelligence, Rio de Janeiro, Brazil, Dec. 2003. Retrieved from the Internet: <URL: http://citeseer.ist.psu.edu/695743.html>, 10 pages (accessed on Dec. 20, 2005).

Reinberger, Marie-Laure et al., "Unsupervised Text Mining for the Learning of DOGMA-inspired Ontologies", Ontology Learning from Text: Methods, Evaluation and Applications, P. Buitelaar, P. Cimiano, and B. Magnini editors, IOS Press 2005. Retrieved from the Internet: <URL:http://www.cnts.ua.ac.be/~mlr/files/reinberger_spynsIOS_revised.pdf>, 15 pages (accessed on Dec. 20, 2005).

Seo, Young-Woo et al., "Feature Selection for Extracting Semantically Rich Words", tech. report CMU-RI-TR-04-18, Robotics Institute, Carnegie Mellon University, Mar. 2004. Retrieved from the Internet: <URL: http://citeseer.ist.psu.edu/seo04feature.html>, 11 pages (accessed on Feb. 21, 2006).

Seo, Young-Woo et al., "Feature Selections for Extracting Semantically Rich Words for Ontology Learning", Proceedings of Dagstuhl Seminar Machine Learning for the Semantic Web, Feb. 2005. Retrieved from the Internet: <URL: http://www.smi.ucd.ie/Dagstuhl-MLSW/proceedings/>, 5 pages (accessed on Feb. 21, 2006).

Shamsfard, Mehrnoush et al., "Learning Ontologies from Natural Language Texts", International Journal of Human Computer Studies, 60:17-63 (2004).

Yang, Stewart et al., "Relative Term-Frequency Based Feature Selection For Text Categorization", The 2002 International Conference on Machine Learning and Cybernetics, Beijing, 2002. Retrieved from the Internet: <URL: http://www.cs.utexas.edu/~windtown/publications.html>, 6 pages (accessed on Dec. 20, 2005).

Yang, Yiming et al., "A Comparative Study on Feature Selection in Text Categorization", in Proceedings of the 14th International Conference on Machine Learning ICML97. Retrieved from the Internet: <URL: http://citeseer.ist.psu.edu/yang97comparative.html>, 9 pages (accessed on Dec. 20, 2005).

Yang, Ying et al., "A Comparative Study of Discretization Methods for Naive-Bayes Classifiers", in *Proceedings of the 2002 Pacific Rim Knowledge Acquisition Workshop (PKAW'02)*, Yamaguchi, T., A. Hoffmann, H. Motoda, and P. Compton (Eds.), Japanese Society for Artificial Intelligence. Tokyo, Japan. Retrieved from the Internet: <URL: http://citeseer.ist.psu.edu/588336.html>, 16 pages (accessed on Dec. 20, 2005).

Zheng, Zhaohui et al., "Feature Selection for Text Categorization on Imbalanced Data", Sigkdd Explorations, 6 (1): 80-89 (2004).

* cited by examiner

DAG Path Table

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | (1) (2) (4) (6) |
| 6 | L(5) | (1) (5) |
| 7 | L(4) | (1) (5) (4) |
| 8 | L(6) | (1) (5) (4) (6) |
|  |  |  |

FIG. 3A

DAG Path Table

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | (1) (2) (4) (6) |
| 6 | L(5) | (1) (5) |
| 7 | L(4) | (1) (5) (4) |
| 8 | L(6) | (1) (5) (4) (6) |
| 9 | L(7) | (1) (2) (7) |
|  |  |  |

FIG. 3B

DAG Path Table

FIG. 3C

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | (1) (2) (4) (6) |
| 6 | L(5) | (1) (5) |
| 7 | L(4) | (1) (5) (4) |
| 8 | L(6) | (1) (5) (4) (6) |
| 9 | L(7) | (1) (2) (7) |

| Path ID | Leaf ID | Path Node List |
|---|---|---|
| 10 | L(8) | (1) (2) (4) (8) |
| 11 | L(8) | (1) (5) (4) (8) |

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | P4 (6) |
| 6 | L(5) | (1) (5) |
| 7 | L(4) | (1) (5) (4) |
| 8 | L(6) | P7 (6) |

FIG. 3E

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | C (4) (6) |
| 6 | L(5) | (1) (5) |
| 7 | L(4) | (1) (5) (4) |

FIG. 3F

SYSTEM AND METHOD OF EFFICIENTLY REPRESENTING AND SEARCHING DIRECTED ACYCLIC GRAPH STRUCTURES IN DATABASES

CROSS-REFERENCE TO RELATED APPLICATIONS

This application claims the benefit of the priority of U.S. Provisional Application Ser. No. 60/778,869, filed Mar. 3, 2006 (with Express Mailing Label No. EV 471533919 US) and entitled "SYSTEM AND METHOD OF EFFICIENTLY REPRESENTING AND SEARCHING DIRECTED ACYCLIC GRAPH STRUCTURES IN DATABASES"; and this application is related to U.S. patent application Ser. No. 11/368,130, filed Mar. 3, 2006(with Express Mailing Label No. EV 471533922 US) and entitled "SYSTEM AND METHOD OF BUILDING AND USING HIERARCHICAL KNOWLEDGE STRUCTURES". The disclosures of the above applications are incorporated herein by reference in their entirety.

BACKGROUND

The present disclosure relates to representation and retrieval of data structures in databases.

Traditionally, stored knowledge has often been represented in a directed acyclic graph (DAG) structure called a semantic network, and more recently, a knowledge ontology. For large knowledge structures, a DAG structure (typically hierarchical) is frequently used for structuring ontology nodes: edges connect more general (source) nodes to more specific (destination) nodes. This DAG structure is often created and stored in a database.

A traditional method for representing trees and DAGs in a database involves the use of Adjacency Lists. An Adjacency List typically consists of pairs of nodes, each pair representing a parent-child connection between nodes. Adjacency Lists typically require navigation of the stored DAG structure and are frequently inefficient for larger graphs. Insertions, updates, and deletions are relatively efficient, however, traversing large portions of a ontology knowledge structure stored using Adjacency Lists can be inefficient.

Recent optimizations include recording full tree paths or using so-called nested-sets and nested intervals to allow sub trees to be efficiently and quickly retrieved. Such methods are generally restricted to strict tree structures. The use of Materialized Paths is also a known approach for representing and searching tree data structures in a database. Other techniques include fractional methods, such as Farey Fractions and Continued Fractions, and simple path enumeration approaches for tree structures.

SUMMARY

This specification discloses various embodiments of technologies for representation and retrieval of data structures in databases. In general, embodiments of the invention feature a computer program product and a method including storing a generalized directed acyclic graph (DAG) in a database, wherein the storing includes encoding path information of the generalized DAG in entries of a path table in the database, the encoding includes converting the path information into text strings, and the entries of the path table correspond to paths in the generalized DAG from nodes of the generalized DAG to a root node of the generalized DAG; triggering generation of a lexical index of the path table using the text strings, wherein the lexical index separately lists tokens included in the entries; and retrieving one or more portions of the generalized DAG from the database for in-memory operations.

These and other embodiments can optionally include one or more of the following features. The storing can include storing the generalized DAG in a relational database. The lexical index can include a B-tree index, and the retrieving can include querying and updating the generalized DAG using the lexical index.

All of the entries can represent respective paths using tokens indicating a full node list for each respective path. The encoding can include compressing the path table by referencing a sub-path within an entry using a single token. The single token can include a placeholder symbol representing multiple sub-paths. The converting can include converting the path information into text strings in accordance with an entry format including a path identifier and a path node list specifying nodes of a given path, and the single token can include a reference to a path identifier of another entry.

The storing can include isolating semantic units of the generalized DAG in data value nodes, where the nodes of the generalized DAG are DAG nodes that reference the data value nodes, and each of the data value nodes are referencable by more than one DAG node including DAG nodes of a second DAG stored in the database. The storing can include representing multiple facets of semantics of a domain as different DAGs, including the generalized DAG and the second DAG.

The storing can include generating an adjacency list of the nodes of the generalized DAG, the adjacency list and the path table together forming a dual representation of the generalized DAG. The retrieving can include retrieving inference chains and sub-DAGs using the path table, and the method and operations can further include collecting statistical information for the generalized DAG using the adjacency list.

In another aspect, embodiments of the invention feature a system including a database encoding a knowledge structure including a graph, wherein the database encodes path information of the graph using at least three tokens for one path in the graph, the at least three tokens indicating nodes of the one path; a database management system configured to access the knowledge structure in the database, the database management system including a text indexing engine; and an interface configured to store and retrieve information in the knowledge structure through the database management system, and the interface configured to trigger the text indexing engine to generate a lexical index of the encoded path information, wherein the lexical index separately lists tokens of paths in the encoded path information, including the at least three tokens indicating the nodes of the one path. The lexical index can include a B-tree index, and the encoded path information can include a compressed path table in which a sub-path within an entry is referenced using a single token.

The knowledge structure can include a multi-faceted knowledge structure including multiple directed acyclic graphs (DAGs) encoded using DAG nodes to indicate DAG structure and data value nodes to share knowledge among the multiple DAGs. The knowledge structure can include an adjacency list, wherein the adjacency list and the encoded path information together form a dual representation of the graph. The interface can be configured to retrieve inference chains and sub-DAGs using the encoded path information, and the interface can be configured to collect statistical information for the graph using the adjacency list.

Particular embodiments of the invention can be implemented to realize one or more of the following advantages. DAGs can be efficiently represented in relational databases, and subsets of DAGs represented in this manner can be efficiently retrieved. Sub-areas of knowledge structures stored using the present systems and techniques can be readily located and accessed, and rapid inferencing can be realized. Moreover, the present systems and techniques can be used with generalized DAGs, and thus need not be limited to tree graph structures. As used herein, the phrases "generalized directed acyclic graph" and "generalized DAG" refer to a DAG structure in which a child node can have multiple parents. Thus, the present systems and techniques need not depend on a knowledge structure having a unique distinguished parent for each sub-structure.

Implementations of the invention can employ a generalized DAG to represent knowledge structures, such as a generated ontology. Moreover, a DAG can be stored in a relational database in a manner, which can, in general, allow applications that employ hierarchical knowledge structures to efficiently represent, search and retrieve DAGs. The described DAG representation systems and techniques can provide significant performance improvements during knowledge retrieval and querying functions, and can have direct application to large Bayesian Belief Networks by providing a means to efficiently locate dependent evidence nodes for computing the conditional probability of any particular event node in the network.

While semantic network DAGs can provide a general framework for representing knowledge, performing machine reasoning and inferencing, they are often inefficient when these structures are large. The present systems and techniques can overcome several efficiency problems inherent to other approaches. For example, the present systems and techniques can allows inference chains in the knowledge structure to be quickly located, materialized and followed for machine reasoning applications; can allow DAG sub-structures such as a topic sub-ontology to be quickly retrieved; and can provide a mechanism for logically and physically sharing knowledge node values within an ontology DAG and across ontology DAGs.

The present systems and techniques can be used in combination with traditional approaches, such as Adjacency Lists and Materialized Paths, and this can result in further improvements in efficiency. In contrast with interval encoding methods, the present systems and techniques offer a representation for DAG structures that are not trees. Furthermore, for DAGs that are trees, the present systems and techniques can provide improved performance for node insertion operations and may require at most M rows to be added to the DAG Path table, where M is the total number of new paths formed by the addition of the new node to the DAG. In addition, for DAGs that are trees, the present systems and techniques can avoid potential problems of fractional methods, such as Farey Fractions and Continued Fractions, where a large number of arithmetic operations on a potentially large subset of nodes within the DAG may need to be performed. The present system and techniques can avoid potential limitations with the numeric precision used to represent the range, and need not run out of precision at around four levels in the DAG. This can have significant advantages for large knowledge structures, which often may be dozens of levels deep.

The present systems and techniques can be especially useful with ontology query operations, where a particularly important query operation can be to follow a set of edges that connect nodes that form a generalization, specialization, or specific inference chain. In environments when inference chains are long and are required to be performed with high frequency, the present systems and techniques can offer significant advantages. Moreover, the present systems and techniques can result in a reduced number of updates being performed when a knowledge structure is modified in a database and can be readily used with structures in which a node may have an arbitrary number of parents (e.g., an ontology in which nodes may have multiple parents).

The present systems and techniques can improve performance when using commercially available database management systems. The present systems and techniques can be readily used to represent a DAG in relational database, while supporting the use of a standard query language such as SQL (Structured Query Language). Moreover, the present systems and techniques can reduce the number of substring comparison needed to access a generalized DAG stored in a database and can maintain efficient DAG representation and access as the average number of parents of DAG nodes increases.

The present systems and techniques support efficient representation of generalized knowledge DAGs, and their semantics, in a database. Searching a knowledge DAG in a database can be improved. Inference chains in a knowledge structure stored in a database can be readily followed and materialized. Sub-graphs of a knowledge DAG stored in a database can be readily retrieved and assembled. In addition, separating structure nodes from data/concept nodes and optionally sharing some data and structure nodes enables support of a multi-faceted semantic network (which may even have cycles) by representing multiple facets or points of view on the semantics of a domain as different DAGs.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

As used herein, the word "document" refers to an electronic document. An electronic document (which for brevity will simply be referred to as a document) does not necessarily correspond to a file. A document may be stored in a portion of a file that holds other documents, in a single file dedicated to the document in question, or in multiple coordinated files. The phrase "generalized directed acyclic graph (DAG)" refers to a DAG structure (directed edges and no cycles) in which a child node can have multiple parents. A "tree" refers to a DAG structure in which each node can have only one parent node. A "graph" includes both trees and generalized DAGs.

In addition, a "database" refers to a collection of integrated records retained in long term storage (i.e., in a mass data store, such as a disk drive system, not just an in-memory data structure). A "database management system" refers to a set of programs used to define, administer and process a database and any associated program applications. A "relational database" refers to a database in which the data resides in tables that are largely independent of each other.

The present application describes a general method for representing and searching large knowledge structures using DAGs. When the structure of machine knowledge is large (e.g., exceeding multiple thousands of related knowledge entities/interrelationships), the use of in-memory data structures and algorithms alone often become impractical for numerous reasons. Thus, an underlying database system can be used to manage this network of knowledge, and the present systems and techniques can be used to efficiently represent, search and retrieve information from such knowledge structures stored using existing database technologies.

Figure 1:
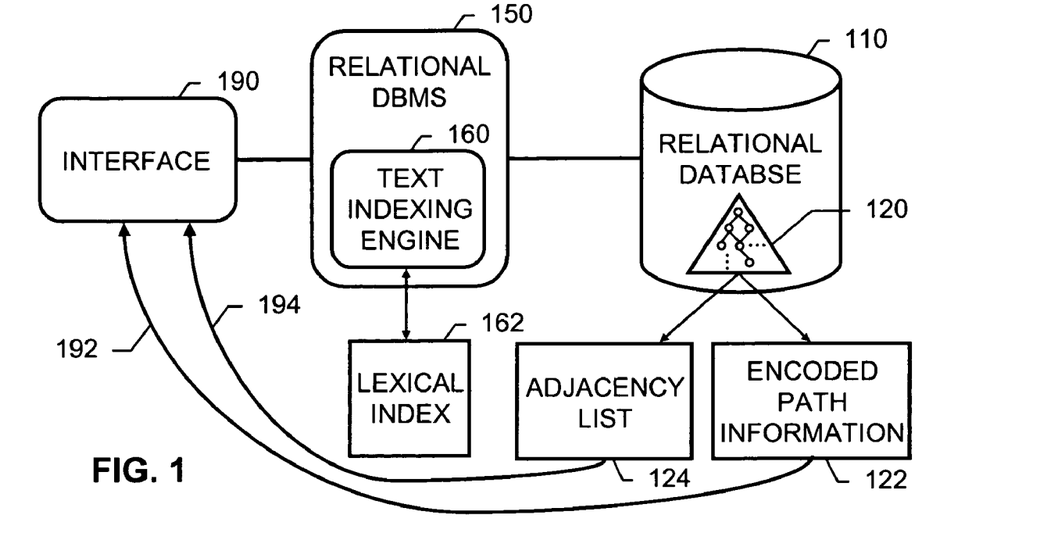
FIG. 1 is a block diagram showing an example system for representing and searching directed acyclic graph structures in a database.

FIG. 1 is a block diagram showing an example system for representing and searching directed acyclic graph structures in a database. A database 110 (e.g., a relational database) encodes a knowledge structure 120 including a graph. The database 110 encodes path information of the graph as encoded path information 122 (e.g., a DAG path table as described below). One or more paths in the graph are each encoded using at least three tokens, where the at least three tokens indicate nodes of the each respective path (e.g., the tokens can be node identifiers or edge identifiers, or a combination thereof).

A database management system (DBMS) 150 (e.g., a relational DBMS) is configured to access the knowledge structure 120 in the database 110. The DBMS 150 can include a text indexing engine 160, which is used to create a lexical index 162 of the encoded path information 122. The DBMS 150 can be a commercially available DBMS (e.g., Oracle 10 g DBMS available from Oracle Corporation of Redwood Shores, Calif.; IBM DB2 available from International Business Machines Corporation of White Plains, N.Y.; MySQL Server available from MySQL AB of Uppsala, Sweden; or Microsoft SQL Server available from Microsoft of Redmond, Wash.).

An interface 190 can be configured to store and retrieve information in the knowledge structure 120 through the DBMS 150. The interface 190 can be configured to trigger the text indexing engine 160 to generate the lexical index 162 of the encoded path information 122, where the lexical index 162 separately lists tokens of paths in the encoded path information 122. The lexical index 162 can include a B-tree index, and the encoded path information 122 can be a compressed path table in which a sub-path within an entry is referenced using a single token, as described further below.

The interface 190 can be a software application designed to operate with the DBMS system 150. The interface 190 can be a separate program component, or the interface 190 can be integrated to varying degrees with the DBMS 150, including potentially being a fully integrated program component of the DBMS 150.

The knowledge structure 120 can be a multi-faceted knowledge structure including multiple DAGs encoded using DAG nodes to indicate DAG structure and data value nodes to share knowledge among the multiple DAGs. Thus, the underlying knowledge graph can be represented using DAG nodes and data values nodes, where the DAG nodes maintain the graph structure, but need not encode semantics directly. Rather, the DAG nodes can reference appropriate data value nodes, which contain the actual knowledge semantics. The data value nodes can be shared within a DAG and across DAGs. An example of this is described in further detail below in connection with FIG. 3D. The separate storage of DAG and data values nodes can facilitate sharing of a concept in multiple DAGs, representing a semantic unit in multiple perspectives. These perspectives allow atomic concepts and semantic networks of concepts to be incorporated into multiple views or knowledge taxonomy facets.

Moreover, the knowledge structure 120 can include an Adjacency List 124, where the Adjacency List 124 and the encoded path information 122 together form a dual representation of the graph. The interface 190 can be configured to retrieve 192 inference chains and sub-DAGs using the encoded path information 122, and the interface 190 can be configured to collect 194 statistical information for the graph using the Adjacency List 124. This dual representation structure can provide additional advantages for the system.

An inference is a process of generalizing, specializing, or making conclusions about information in a knowledge structure, typically by following a chain of edges which connect relevant knowledge nodes. The encoded path information 122 can support rapid retrieval of inference chains and sub-DAGs to a main memory representation, enabling significant improvement in processing time for these types of operations. Moreover, other operations that are well suited to the Adjacency List structure can use the Adjacency List 124. The Adjacency List 124 can be used for insert, update, and delete maintenance (allowing updates to be readily performed), and the Adjacency List 124 can include associated edge weight information for use in collecting statistical information about the knowledge structure 120.

Figure 2:
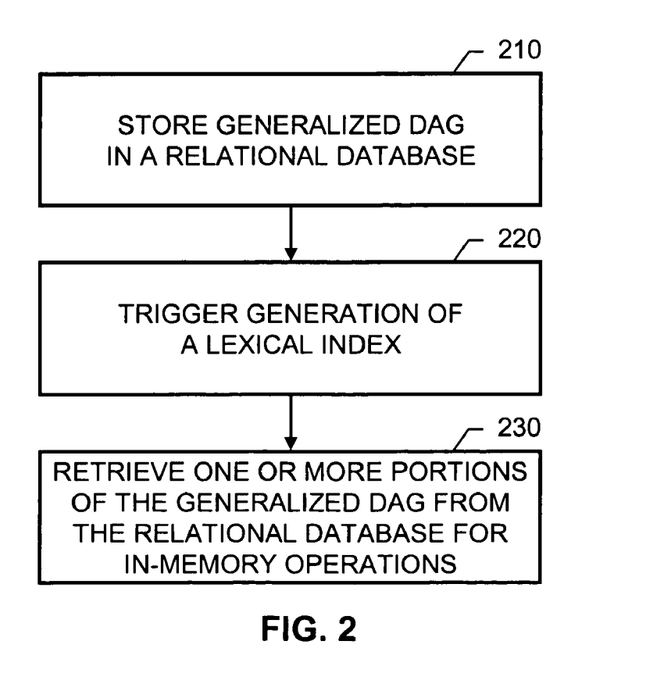
FIG. 2 is a flowchart showing an example process of representing and searching a generalized directed acyclic graph in a relational database.

FIG. 2 is a flowchart showing an example process of representing and searching a generalized DAG in a relational database. A generalized DAG can be stored at 210 in a relational database. This can involve encoding path information of the generalized DAG in entries of a path table in the relational database, where the entries of the path table correspond to paths in the generalized DAG from nodes of the generalized DAG to a root node of the generalized DAG, and one of the entries represents a path using three or more tokens indicating nodes of the path (e.g., the tokens can be node identifiers or edge identifiers, or a combination thereof).

Generation of a lexical index can be triggered at 220. The lexical index can separately list tokens included in the entries of the path table, including the three or more tokens indicating nodes of the path. The lexical index can include a B-tree index.

One or more portions of the generalized DAG can be retrieved at 230 from the relational database for in-memory operations. This retrieval can include querying and updating the generalized DAG using the lexical index. The retrieving at 230 can include retrieving inference chains and sub-DAGs using the path table. Moreover, the storing at 210 can include generating an adjacency list of the nodes of the generalized DAG, and the retrieving at 230 can include collecting statistical information for the generalized DAG using the adjacency list.

FIGS. 3A-3F show example implementation details of the present systems and techniques. The following description of example implementation details addresses four major elements, the algorithms used to insert and delete nodes from the DAG, and how the logical and physical data value sharing mechanism works, which can allow symbolic knowledge to be shared both within a single ontology and across different ontologies. The four major elements are as follows: (1) a DAG-PATH table used to enumerate all possible paths form the root node to each node in the DAG; (2) an indexing technique used to rapidly locate any DAG node in the DAG and all relevant paths that the node participates in, which can allow inference chains to be quickly followed and materialized; (3) a common knowledge operation involving the retrieval and materialization of a sub-DAG of the knowledge structure, where the path entries can be used to rapidly fetch a sub-DAG; and (4) an indirection mechanism that allows DAG node data values to be shared within a DAG, and in addition, Data Values can also be shared across different DAGs via the Data Value nodes.

Figure 3A:
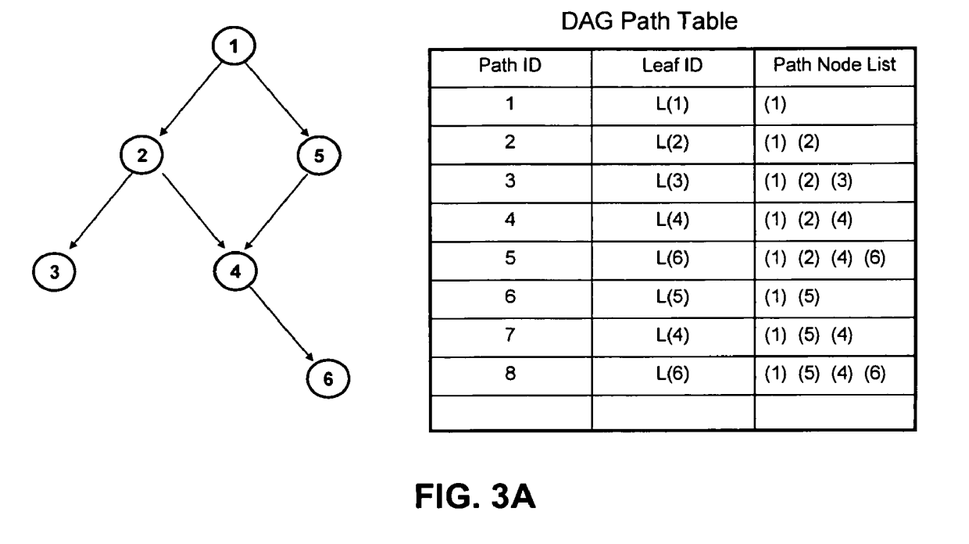
FIG. 3A shows an example initial directed acyclic graph (DAG) structure.
Figure 3B:
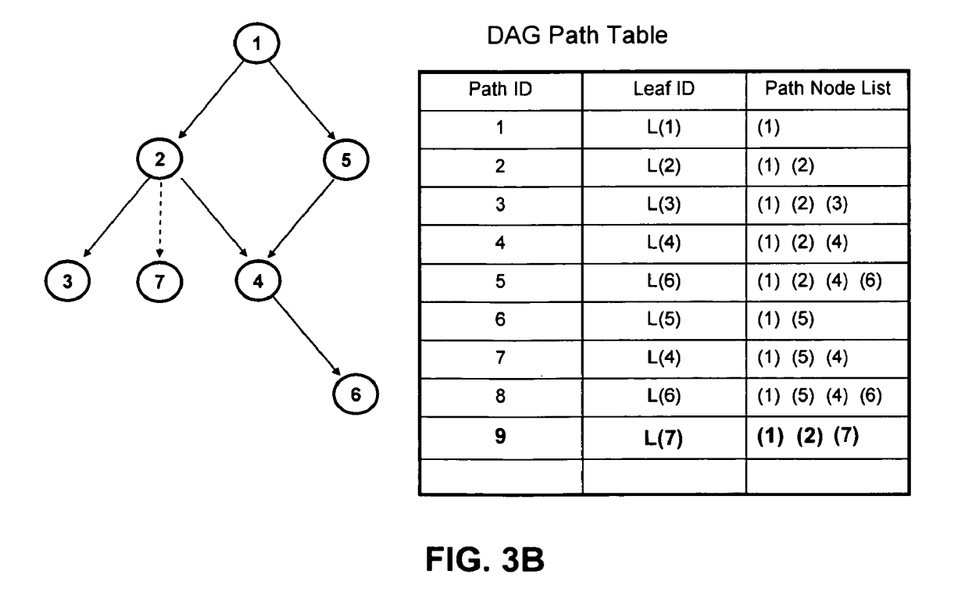
FIG. 3B shows an example of adding a new node and path to the DAG structure of FIG. 3A.
Figure 3C:
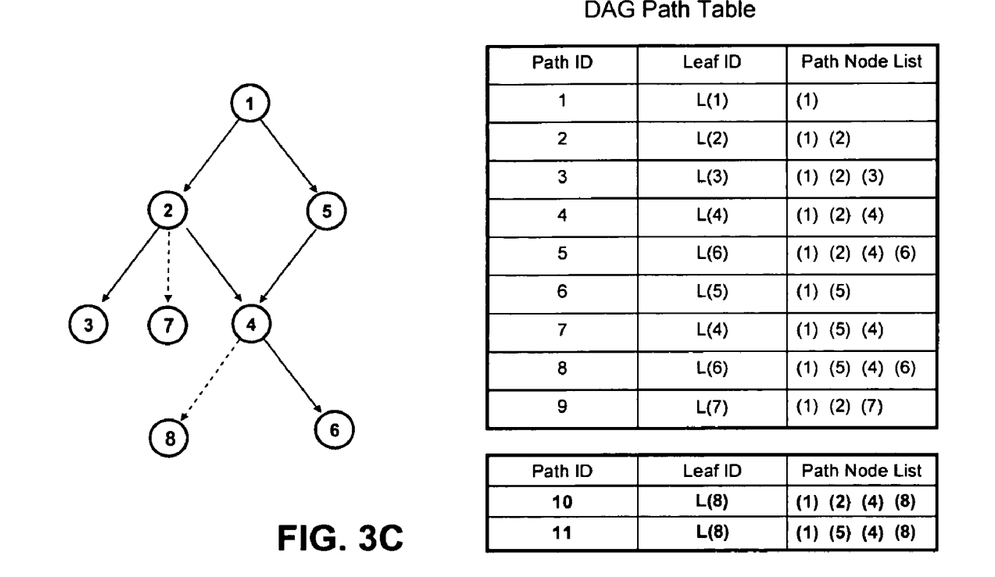
FIG. 3C shows an example effect of adding a second new node to the DAG structure of FIG. 3B, and the resulting paths.
Figure 3D:
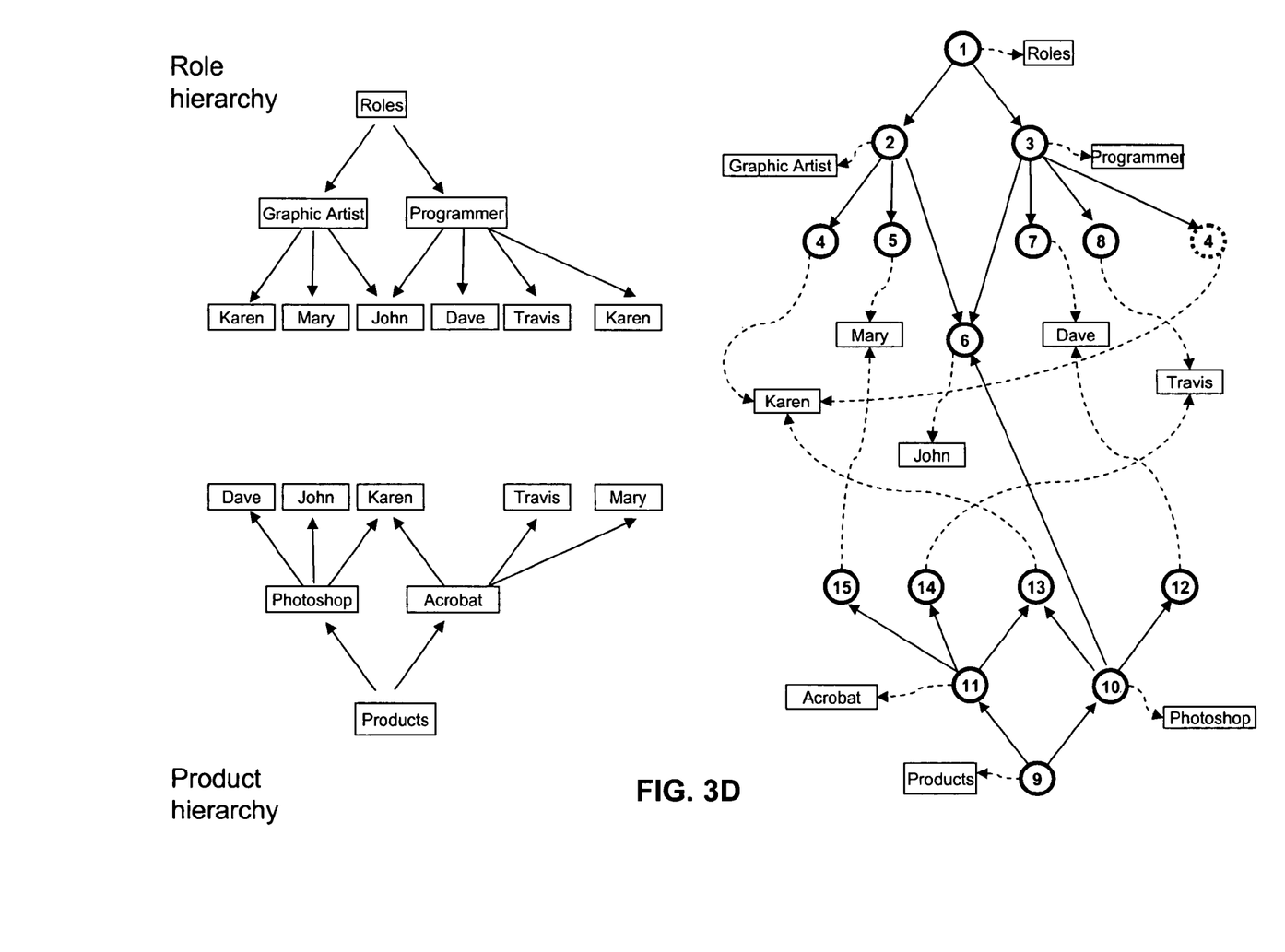
FIG. 3D shows example DAG taxonomy structures with shared data nodes.

FIG. 3A shows an example initial DAG structure. FIG. 3B shows an example of adding a new node and path to the DAG structure of FIG. 3A. FIG. 3C shows an example effect of adding a second new node to the DAG structure of FIG. 3B, and the resulting paths. FIG. 3D shows example DAG taxonomy structures with shared data nodes. For the purposes of explanation, in FIGS. 3A-3C, data node value sharing is not initially addressed. Subsequently, and in FIG. 3D, data node sharing is shown and described. A node indicated by a circle is a DAG Node, i.e., these nodes are used to form the DAG structure. A separate type of Data Node can be used to contain data values and is discussed in connection with FIG. 3D.

The basic operations used include inserting, deleting, and fetching nodes from the DAG structure and updating the DAG Path table to reflect these operations. The operations on the DAG can be expressed by using a combination of the primitives A-H defined below:

A. Find all paths from any Node to the Root node:
   Find all paths having a specific Node as a leaf.
B. Find the sub-DAG rooted at a Node:
   Find all paths that a Node participates in excluding the paths for which Node is a leaf.
   The irrelevant portions of the sub-DAG are prefixes of the path strings that occur before the specific Node.
C. Find all directed paths between Node A and Node B:
   Find all paths having both A and B in any order, having one of them as a leaf.
D. Find all minimum length undirected paths between Node A and Node B:
   1. Find all directed paths between Node A and Node B, call this set Pi.
   2. Find all paths Pa from Node A to the Root Node, but not having Node B. Find all paths Pb from B to the Root Node, but not having Node A. Take the cross product of these two sets:

$P = Pa \times Pb$ for each pair in the cross product P, if the length of the shortest common prefix on the path is k, remove the first k−1 nodes from each of the two paths. This gives two paths that, when joined by their single common leftmost node, form an undirected path between A and B.
   3. The union of P and Pi together represent all undirected paths between Node A and Node B.

Insertion of nodes into the DAG involves the following primitives E and F:

E. Insert a new Node into the DAG. When a new node is added, the following algorithm can be used:
   Case 1: Node is to be a root.
      1. Record the node data if it does not exist.
      2. Create a DAG node N that references the new node.
      3. Insert the new path including the DAG node, and an identifier for the leaf node N of the path.

Case 2: Node is to be a child of some other node O.
      1. Record the node data if it does not exist.
      2. Create a DAG node N that references the new node.
      3. Find all paths that have O as a leaf node. Call these paths Po. Let Pn be the set consisting of the path having just node N. Connect all paths in Po to all paths in Pn by the cross product of Po and Pn:

$Po \times Pn$

F. Insert a new Edge into the DAG having source Node SRC and destination Node DST.

When a new edge is added, the following algorithm can be used:
   1. Find all paths for which the SRC Node is a leaf. Call these paths Pi
   2. Find all distinct paths for which DST Node is a Root Node. Call these paths Pj.
   3. Connect all paths in Pi to all paths in Pj by the cross product of Pi and Pj:

$Pi \times Pj$

As shown in FIG. 3A, given a knowledge DAG with nodes (1), (2), (3), (4), (5), (6), connected as shown, the DAG Path table is as shown in FIG. 3A. As each node is added, the DAG Path Table lists all possible paths to each node (indicated as a Leaf node using LeafID). E.g., for Node (6), all possible paths are enumerated: (1) (2) (4) (6) and a second path: (1) (5) (4) (6). As shown in the example of FIG. 3B, a new Node (7) is to be added to the DAG. The addition of this node results in exactly one new DAG Path entry: (1) (2) (7). Finally, FIG. 3C shows an example of how multiple DAG Path entries are created. Here a new Node (8) is added. All possible paths to Node (8) are indicated: (1) (2) (4) (8) and the second path (1) (5) (4) (8).

Deletion of nodes from the DAG involves the following primitives G and H:

G. Delete a Node from the DAG. When an existing node is deleted, the following algorithm can be used:
   1. Locate all paths that the node is on.
   2. Delete those paths.
   Note that this deletes all nodes which do not have ancestors other than Node.

H. Delete an Edge from the DAG. When an existing edge is deleted,
   1. Locate all paths that the Edge is on.
   2. Delete those paths.
   Note that if DST has no other parent besides SRC where SRC and DST are the source and destination of Edge (respectively), then this operation is equivalent to deleting DST.

Data node value sharing: In the description above, Node(4) has two parent DAG nodes (Node(2) and Node(3)). The concept associated with Node(4) is physically and logically shared by it's parent nodes. Node sharing is important in semantic networks; when changes are made to the concept associated with Node(4), all updates can be made consistently in one place and will ensure that the knowledge semantics are correctly expressed. Further, since concepts in the knowledge structure can be arbitrarily large, an important feature of the present systems and techniques is the separation of the structure of the DAG and the actual information contained in each of the nodes of the DAG.

The present systems and techniques can include a mechanism by which a data value can be associated with each DAG node such that the data value can be separately maintained and shared. A data value can be a topic category, a concept, one or more text terms, or a larger text object. In most cases (e.g., for knowledge taxonomies and knowledge ontologies), the data value node is shared. In addition, the DAG node used to form the structure of the total DAG can also be shared. This can be accomplished by associating a Data Node with each DAG Node, and then using bi-directional indexing to determine what data value concept is associated with which DAG Nodes, and the inverse, given a concept, determining all DAG Nodes that use the specified concept (in either a single DAG or across DAGs).

In DAGs where data values need to be shared, the basic insertion and deletion algorithms described above can be extended in the following manner:

DAG Node Insertion With Sharing:
1. Check to see if a Data Node already exists with the new Data Node value.
2. If a matching Data Node does not exist, create one and a new ID, also create a corresponding DAG Node and a new ID for the DAG Node.
3. If a matching Data Node was found, get it's ID and it's associated DAG Node ID.
4. Using the Data Node ID from step 2 or 3 above, connect the DAG Node into the DAG at the specified location.
5. Update the DAG Path table as described above.

DAG Node Deletion With Sharing:
1. Locate the DAG Node and it's associated Data Node to be deleted.
2. If the located DAG Node is only referenced by other DAG Nodes in the current DAG, delete the DAG Node.
3. If the located DAG Node is referenced by other DAG Nodes in other DAGs, only delete the links from the referencing DAG Nodes in this DAG.
4. Locate all DAG Nodes that are associated with the Data Node.
5. If there are no other references to the located Data Node, delete the Data Node. Otherwise, if there are other references, leave the Data Node since DAG Nodes in other DAGs still reference the data value stored in this DAG Node.
6. Update the DAG Path table as described above.

Consider the following node sharing example where two content taxonomies are to be constructed. The first taxonomy organizes people by job roles. In some cases, an individual may have multiple roles. The second taxonomy indicates which individuals are working on which product. DAG Nodes are indicated by circles, DAG Node IDs are indicated by a number. Data Nodes are indicated by rectangles, data node values are shown as text.

In the left-side of FIG. 3D, Karen, Mary, and John have roles as Graphic Designers. John, Dave, Travis, and Karen have roles as Programmers. Additionally, Dave, John, and Karen work on Photoshop. Karen, Travis, and Mary work on Acrobat. The two different taxonomies present different views or perspectives over the same people entities. The ability to support multiple hierarchical views of information is an important aspect of the present systems and techniques and directly supports the concept of faceted taxonomies and ontologies.

The present systems and techniques support two separate policies for sharing DAG nodes. Each policy is material for constructing and representing a semantic network or arbitrary DAG. The first policy considers that DAG nodes are shared within the same DAG only. The second policy assumes that DAG nodes are potentially shared with other DAGs. By enforcing the first policy, the invention can ensure that a DAG that is not a tree can be represented efficiently as a DAG. Furthermore, DAG Nodes can be represented independently of other DAG Nodes that refer to the same Data Node, preserving the distinct semantic relationships between other nodes in the graph. The second policy reduces the number of nodes created and moreover allows networks of DAGs to be interconnected.

FIG. 3D illustrates the procedure for adding a new element in both cases. When a new element is added into any DAG with shared nodes, the present systems and techniques can locate and use a matching existing value. Assume the first taxonomy for Roles exists, and Dave is to be added into the second taxonomy. Data Node(Dave) is located, associated DAG Node(12) is created, and DAG Node (12) is connected to Product taxonomy DAG Node(10). This results in the "Dave" Data Node being shared by both Role and Product Taxonomies, but the DAG node is not shared (then both taxonomies can later explicitly represent different knowledge about the DAG Node having Data Node (Dave)). This example and both completed taxonomies are shown on the right-hand side of FIG. 3D. In the second scenario, the node to be added to one taxonomy is structurally shared with another taxonomy. Assume that John is to be added to the second taxonomy. Data Node (John) is located, associated DAG Node (6), shared with the Role taxonomy, is located, and DAG Node (6) is connected to Product taxonomy DAG Node(10).

Given two types of nodes (DAG and Data nodes), and given that each node type can be either shared or non-shared, this gives rise to the following truth-table which enumerates the various sharing models presented by the here.

TABLE 1

|  | DAG Node | Data Node |
| --- | --- | --- |
| Replicate sub-DAGs | Unshared | Unshared |
| Share concepts, DAG is always a tree structure | Unshared | SHARED |
| Not used (means multiple Data Nodes may be attached to common DAG Node) | SHARED | Unshared |
| Share concepts, minimize storage; supports Bayesian Belief Networks | SHARED | SHARED |

The present systems and techniques provide a mechanism to select the appropriate sharing model. By default, both DAG Nodes and Data Nodes can always be shared.

In addition, rather than enumerating a full node list for each respective path, as described above, DAG path compression can be employed in a DAG Path Table by factoring out common prefix paths. This DAG path compression can involve shortening the Path Node List by referring to sub-paths using the Path ID in the Path Node List. Alternatively, this DAG path compression can involve shortening the Path Node List and having fewer entries in the DAG Path Table by referring to arbitrary sub-paths by a placeholder, such as "C" (although this can potentially result in more expensive queries).

Figure 3E:
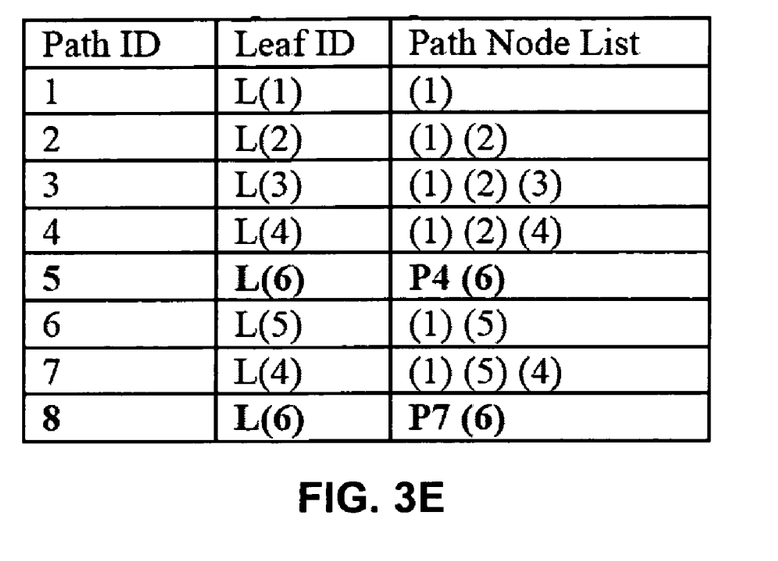
FIG. 3E shows an example DAG path table with path compression.

Referring to the graph of FIG. 3A, path entries 5 and 8 can be compressed as follows. FIG. 3E shows an example DAG path table with path compression implemented using references to the Path ID in the Path Node List, rather than fully enumerating the path. Thus, "(1) (2) (4)" of entry 5 is replaced by "P4 (6)", where the "P4" token indicates the Path Node List of entry 4, and the "(6)" token indicates the addition of Node (6) to the referenced sub-path P4. Likewise, "(1) (5) (4)" of entry 8 is replaced by "P7 (6)", where the "P7" token indicates the Path Node List of entry 7, and the "(6)" token indicates the addition of Node (6) to the referenced sub-path P7.

This approach to path compression can result in considerably shorter path lists, which can result in smaller tables (e.g., reduced string lengths with the same number of rows) particularly when the fan out is large (and also when a node with descendants may have multiple parents, and many paths too the root). However, in this case, a new token index entry is created for each path ID that is compressed, and the additional complexity may require multiple roundtrip operations for inference chain retrieval and sub-graph retrieval. Reducing these additional round-trip requests to query the database can be accomplished by using a caching mechanism to store previously seen path IDs and their expansions, and then periodically updating this cache.

Updates and deletions to the graph can continue operate as described above. The retrieval algorithms can be as follows:

To retrieve all descendants of a node having DAG Node ID N:
  1) Fetch all paths having N as an ID in the Path Node List
  2) Trim all fetched path node lists so that N is the first node in each list
  3) Retrieve all nodes from the lists, add them to Descendants
  4) Collect the path IDs in P
  5) While there are path IDs in P
     a. Retrieve all path node lists that contain as a list element a path ID in P
     b. Set P to the empty set
     c. Collect the nodes in these retrieved lists into Descendants
     d. Collect the paths signified in these lists into P
     e. Set P to the path IDs of the retrieved paths
  6) Descendants is the set of all nodes that are descendants of N. To retrieve the structure of the graph, use the paths fetched or batch query the adjacency list for all the nodes. To retrieve the node values, query the DAG NodeData view To retrieve all paths from a node N to the root:
  1) Fetch all paths having L(N) as the leaf ID into S
  2) Collect the path IDs in P
  3) While there are path IDs in P
     a. Retrieve all path node lists that contain as a list element a path id in P. Call this set K.
     b. Using K, rebuild all paths in S referring to a path in P
     c. Reset P to consist of all path IDs in all lists in K
  4) S is the set of all paths from N to the root node. The IDs in these paths can be used to, query the DAG NodeData view for the node names.

Figure 3F:
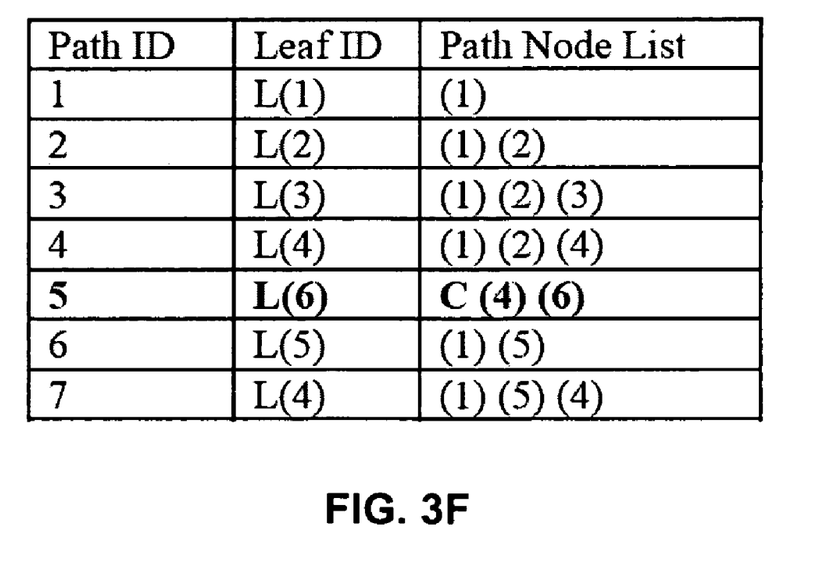
FIG. 3F shows another example DAG path table with path compression.

FIG. 3F shows another example DAG path table with path compression (for the graph of FIG. 3A) implemented using references to the leaf node of a compressed path, including a prefix in the path node list that signifies the compressed path, such as "C", instead of fully enumerating the path or including a path ID. This is analogous to the previous path compression algorithm: for every path that is referenced in a path node list, rewrite the path node list to have the prefix C and suffix the leaf node of the path followed by the other nodes in the path node list.

Entry 8 has been removed because path 8 is already represented by path 5 above. Path 5 in this table represents the original path 5 (1 2 4 6) and the original path 8 (1 5 4 6) in the uncompressed table. Referring to the retrieval algorithms, any path that has 4 as a leaf will prefix any other path that has as tokens in it's path string "C" followed by "4". Thus, the "C" can be visualized as being a signifier that the nodes following it connect to another path, and in this example, the nodes following "C" connect to paths 4 and 7 by Node (4)

The retrieval algorithms here can be as follows:

To retrieve all descendants of a node having DAG node ID N:
  1) Fetch all paths having N as an ID in the Path Node List
  2) Trim all fetched path node lists so that N is the first node in each list
  3) Collect in P all leaf nodes on the fetched paths
  4) Retrieve all nodes from the lists, Descendants
  5) While there are node IDs in P
     a. Retrieve all path node lists that contain "C" as a first element followed by a node ID that is in P
     b. Set P to the empty set
     c. Collect the nodes in these retrieved lists into Descendants
     d. Collect the leaf nodes on these paths into P
  6) Descendants is the set of all nodes that are descendants of N. To retrieve the structure of the graph, use the paths fetched or batch query the adjacency list for all the nodes. To retrieve the node values, query the DAG NodeData view To retrieve all paths from a node N to the root:
  1) Fetch all paths having L(N) as the leaf ID into S
  2) For all paths in S beginning with "P", collect the node ID that follows the letter "P" into P
  3) While there are node IDs in P
     a. Retrieve all path node lists that contain as a leaf node a node ID in P. Call this set K.
     b. Using K, rebuild all paths in S referring to a path in P
     c. Reset P to consist of all path IDs in all lists in K
  4) S is the set of all paths from N to the root node. The IDs in these paths can be used to, query the DAG NodeData view for the node names.

This second approach can result in greater compression of the path table. However, this second approach may also make the queries more expensive or require more filtering: step 5a in retrieving a sub-graph, for example, imposes a requirement on the second "element" of the path node list, which is a more expensive query operation than a query on an individual (indexed) token. In both path compression examples above, only select paths in the graph have been compressed: paths for which the leaf node had multiple parents. Thus, only the paths 5 and 8 in the original table in FIG. 3A were compressed.

As before, the basic operations used are inserting, deleting, and fetching nodes from the DAG structure and updating the DAG Path table to reflect these operations. All operations on the DAG can be expressed using a combination of the primitives A-H defined below:

A. Find all directed paths between Node A and Node B:
  Find all paths having both A and B in any order, having one of them as a leaf.
  Find all paths having A as a leaf and some compressed path; of the referenced paths, retrieve the paths that contain B
  Find all paths having B as a leaf and some compressed path; of the referenced paths, retrieve the paths that contain A B. Find all minimum length undirected paths between Node A and Node B (algorithm unchanged):
  1. Find all directed paths between Node A and Node B, call this set Pi.

2. Find all paths Pa from Node A to the Root Node, but not having Node B. Find all paths Pb from B to the Root Node, but not having Node A. Take the cross product of these two sets:

$P = Pa \times Pb$ for each pair in the cross product P, if the length of the shortest common prefix on the path is k, remove the first k−1 nodes from each of the two paths. This gives two paths that, when joined by their single common leftmost node, form an undirected path between A and B.

3. Note that the cross product may remove redundant nodes on any resulting path, (e.g., path between A and D in a graph rooted at C is A, B, C, B, D, but the shortest path is simply A, B, D)

4. The union of P and Pi together represent all undirected paths between Node A and Node B.

Insertion Algorithm

C. Insert a new Node into the DAG. When a new node is added, the following algorithm can be used (both of these algorithms are the same as in the non-compressed case, since a compressed path reference is always followed by at least one node ID, so the task of finding all paths that have O as a leaf node, for example, is unchanged):

Case 1: Node is to be a root
1. Record the node data if it does not exist.
2. Create a DAG node N that references the new node
3. Insert the new path consisting of the DAG node, and an identifier for the leaf node N of the path Case 2: Node is to be a child of some other node O
1. Record the node data if it does not exist.
2. Create a DAG node N that references the new node
3. Find all paths (only the rows) that have O as a leaf node. Call these paths Po. Let Pn be the set consisting of the path having just node N. Connect all paths in Po to all paths in Pn by the cross product of Po and Pn:

$Po \times Pn$

D. Insert a new Edge into the DAG having source Node SRC and destination Node DST.

When a new edge is added, the following algorithm can be used:
1. Find all paths that the SRC Node is a leaf of. Call these paths Pi
   a. This is analogous to finding all paths from SRC to the root, or all "inference chains" ending in SRC
2. Find all distinct paths that DST Node is a Root Node of. Call these paths Pj
   a. This is exactly analogous to the algorithm for finding all descendants of DST: first all paths containing DST are sought, and then all compressed paths referencing any of those paths are also sought. In the first compression approach, this is accomplished by searching for the compressed paths having the path IDs in question referenced; in the second compression approach, this amounts to finding all compressed paths beginning with P followed by the node id in question (a leaf node of one of the retrieved paths)
3. Connect all paths in Pi to all paths in Pj by the cross product of Pi and Pj:

$Pi \times Pj$

Deletion Algorithm

E. Delete a Node from the DAG. When an existing node is deleted, the following algorithm can be used:
1. Locate all paths that the node is on
   a. In the compressed case, this amounts to locating referenced/compressed paths as well: first any path containing the node, then any path referencing an existing path (and the process repeated until there no more new paths referenced)
2. Delete those paths.

Note that this deletes all nodes which do not have ancestors other than Node.

H. Delete an Edge from the DAG. When an existing edge is deleted, the following algorithm can be used:
1. Locate all paths that the Edge is on
2. Delete those paths.

Note that if DST has no other parent besides SRC, where SRC and DST are the source and destination of Edge (respectively), then this operation is equivalent to deleting DST.

This algorithm is a slightly more intricate case where paths are compressed:

In the first compression algorithm that uses the pathID, this amounts to finding all paths that contain SRC followed by DST, plus all compressed paths that have as a first non-compressed node DST, and reference a path having SRC as a leaf, and deleting those paths. In the second algorithm, the algorithm for deletion of an edge is unchanged, since no paths are explicitly mentioned and all edges are explicitly captured in the path lists.

Typical uses of DAGs in semantic networks apply to DAGs that are mostly trees. That is, most of the nodes have only one parent, while some may have more, but likely fewer than three. Thus, a data structure that represents generalized DAGs is needed, the implementation of this data structure that is most convenient for DAGs that are nearly trees is likely preferred. The path compression approaches described above are generally well suited for this. Because typical DAGs in many implementations are mostly trees, the advantage of the second compression approach over the first compression approach may be small. Moreover, the second compression approach may involve more expensive queries since the database token indexing method may not account for the ordinal value of the tokens. Therefore in implementations where the DAGs are mostly trees, the first compression approach may be preferred over the second compression approach.

In addition, it should be noted that path compression offers several potential space-saving advantages. Important considerations include the decision about when to compress paths (upon any update or in batch modes offline) and the decision about which paths to compress. Regarding the latter consideration, one could compress all paths in a DAG, so that, for example, a path node list never has more than two node IDs, and always has a compressed path (except at the root). However, this may be undesirable as it tends to negate the advantages of path enumeration and lexical indexing described herein. With that being observed, suitable heuristics for compression can be tailored to the kinds of graphs and the kinds of updates expected to be made to the graph in order to optimize the queries and the space required.

One heuristic is to always compress paths that have at least four nodes. Another heuristic is to compress based on in-degree and out-degree. For instance, two children of a node share all the same paths of a node to the root, so a good candidate heuristic for path compression is at nodes that have more than 4 children. If those children have descendants, that may be an even better candidate for path compression. Another important consideration is to compress paths at nodes that have more than one parent.

Path compression can be integrated with the insertion and deletion algorithms to ensure constraints on path length and depth as well as in-degree are enforced. Alternately, path compression can be applied offline in batch mode to enforce constraints. Path compression may be a combination of both approaches: consider, for example, the insertion of a sub-graph as a child of some other node N; paths from N to the root can be compressed online.

In many implementations, graphs are largely created in memory during augmentation, or augmented by adding multi-node sub-graphs. Therefore, path compression over the entire DAG can be deferred to batch mode, or occur during persistence of the DAG, in order to allow optimal path compression. For the DAGs described in herein, it is expected that the updates (edge and node insertions and deletions) will likely alter the graph slowly over time, so the compression can occur in batch mode unless a multi-node sub-graph is inserted. Moreover, since the graphs used in many implementations are mostly trees, it may preferable to use the first compression approach, and compresses paths for paths that have four or more nodes and for which the leaf node has either out-degree at least four or in-degree at least two.

Figure 4:
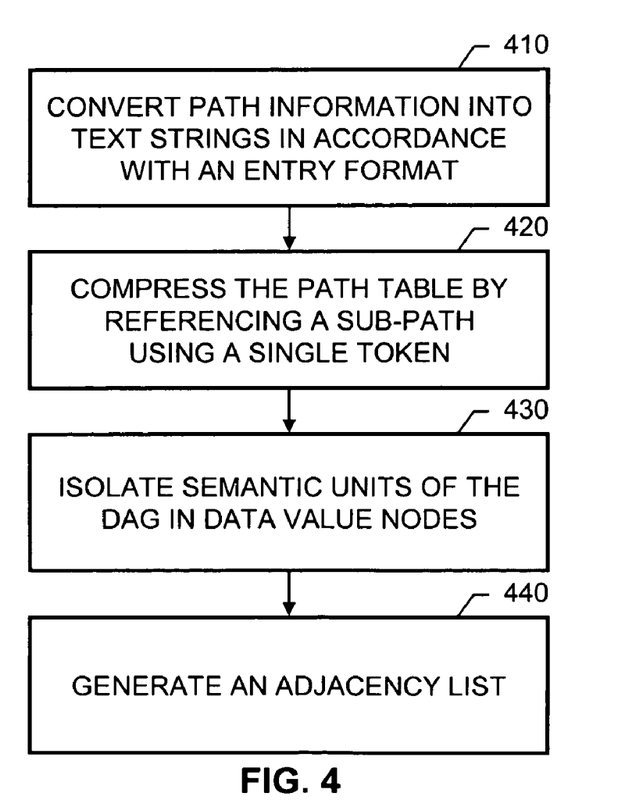
FIG. 4 is a flowchart showing an example process of storing a generalized DAG in a relational database.

FIG. 4 is a flowchart showing an example process of storing a generalized DAG in a relational database. Path information can be converted at 410 into text strings in accordance with an entry format, such as those describe above. The path table can be compressed at 420 by referencing a sub-path within an entry using a single token, such as described above. The conversion at 410 and compression at 420 represent operations in the encoding process described above and need not be separate operations.

Semantic units of the DAG can be isolated at 430 in data value nodes, such as described above. Moreover, an adjacency list of the nodes of the DAG can be generated at 440, such as described above, to create a dual representation of the DAG.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single, file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

Database tables can be stored in files (line and tab-delimited) or in memory as hashtables. Indexes can be in-memory B-trees or hashtables. Adding table rows amounts to adding lines in the file or querying the appropriate hash tables and performing table and index updates. Querying may involve scanning the file and performing regular expression pattern matching, and querying the data structures similarly. Additionally, more information can be included in the database tables. For example, a path table can also include edge information (e.g., edge weights, edges types, etc.) for the DAG, such as by adding a path edge list that corresponds to a path node list in a path table. A path edge list can also be processed in a manner corresponding to the path node list, including use of a lexical indexing and compression for the path edge list.

Moreover, the present systems and techniques can be implemented in a broader context than just relational databases, such as implementations using file systems, B-trees, associative memory, or an Object Oriented Database (OODB). For example, the invention can be implemented by defining OODB complex objects that encapsulate DAG, Node, Edge, and Path objects and their behaviors (with suitable index-based access paths), in which case, the invention can directly use commercial OODB products such as Objectivity/DB (available from Objectivity, Inc. of Sunnyvale Calif.), Ontos DB (available from Ontos, Inc. of Lowell, Mass.), Versant (available from Versant Object Technology Corp. of Menlo Park, Calif.), ObjectStore (available from Object Design, Inc. of Burlington, Mass.), or GemStone (available from GemStone Systems, Inc. of Beaverton, Oreg.).

What is claimed is:

1. A computer-implemented method comprising:
   storing a generalized directed acyclic graph (DAG) in a database, wherein
   the storing comprises encoding path information of the generalized DAG in entries of a path table in the database,
   the encoding comprises converting the path information into text strings, and
   the entries of the path table correspond to paths in the generalized DAG from nodes of the generalized DAG to a root node of the generalized DAG;
   triggering generation of a lexical index of the path table using the text strings,
   wherein the lexical index separately lists tokens included in the entries; and
   retrieving one or more portions of the generalized DAG from the database for in-memory operations;
   wherein the storing comprises generating an adjacency list of the nodes of the generalized DAG. the adjacency list and the path table together forming a dual representation of the generalized DAG.

2. The method of claim 1, wherein the storing comprises storing the generalized DAG in a relational database.

3. The method of claim 1, wherein the lexical index comprises a B-tree index.

4. The method of claim 1, wherein the retrieving comprises querying and updating the generalized DAG using the lexical index.

5. The method of claim 1, wherein all of the entries represent respective paths using tokens indicating a full node list for each respective path.

6. The method of claim 1, wherein the encoding comprises compressing the path table by referencing a sub-path within an entry using a single token.

7. The method of claim 6, wherein the single token comprises a placeholder symbol representing multiple sub-paths.

8. The method of claim 6, wherein the converting comprises converting the path information into text strings in accordance with an entry format comprising a path identifier and a path node list specifying nodes of a given path, and the single token comprises a reference to a path identifier of another entry.

9. The method of claim 1, wherein the storing comprises isolating semantic units of the generalized DAG in data value nodes, where the nodes of the generalized DAG are DAG nodes that reference the data value nodes, and at least two of the data value nodes are each referenced by more than one DAG node including a DAG node of a second DAG stored in the database.

10. The method of claim 9, wherein the storing comprises representing multiple facets of semantics of a domain as different DAGs, including the generalized DAG and the second DAG.

11. The method of claim 1, wherein the retrieving comprises retrieving inference chains and sub-DAGs using the path table, and the method further comprises collecting statistical information for the generalized DAG using the adjacency list.

12. A computer-implemented system comprising:
one or more storage devices and one or more processors configured to effect elements comprising:
a database encoding a knowledge structure comprising a graph, wherein the database encodes path information of the graph using at least three tokens for one path in the graph, the at least three tokens indicating nodes of the one path;
a database management system configured to access the knowledge structure in the database, the database management system including a text indexing engine; and
an interface configured to store and retrieve information in the knowledge structure through the database management system, and the interface configured to trigger the text indexing engine to generate a lexical index of the encoded path information, wherein the lexical index separately lists tokens of paths in the encoded path information, including the at least three tokens indicating the nodes of the one paths;
wherein the knowledge structure comprises an adjacency list, wherein the adjacency list and the encoded path information together form a dual representation of the graph.

13. The system of claim 12, wherein the lexical index comprises a B-tree index.

14. The system of claim 12, wherein the encoded path information comprises a compressed path table in which a sub-path within an entry is referenced using a single token.

15. The system of claim 12, wherein the knowledge structure comprises a multi-faceted knowledge structure including multiple directed acyclic graphs (DAGs) encoded using DAG nodes to indicate DAG structure and data value nodes to share knowledge among the multiple DAGs.

16. The system of claim 12, wherein the interface is configured to retrieve inference chains and sub-DAGs using the encoded path information, and the interface is configured to collect statistical information for the graph using the adjacency list.

17. A computer program product, encoded on a computer-readable medium, operable to cause data processing apparatus to perform operations comprising:
storing a generalized directed acyclic graph (DAG) in a database, wherein
the storing comprises encoding path information of the generalized DAG in entries of a path table in the database,
the encoding comprises converting the path information into text strings, and
the entries of the path table correspond to paths in the generalized DAG from nodes of the generalized DAG to a root node of the generalized DAG;
triggering generation of a lexical index of the path table using the text strings, wherein the lexical index separately lists tokens included in the entries; and
retrieving one or more portions of the generalized DAG from the database for in-memory operations
wherein the storing comprises generating an adjacency list of the nodes of the generalized DAG. the adjacency list and the path table together forming a dual representation of the generalized DAG.

18. The computer program product of claim 17, wherein the storing comprises storing the generalized DAG in a relational database.

19. The computer program product of claim 17, wherein all of the entries represent respective paths using tokens indicating a full node list for each respective path.

20. The computer program product of claim 19, wherein the encoding comprises compressing the path table by referencing a sub-path within an entry using a single token.

21. The computer program product of claim 20, wherein the single token comprises a placeholder symbol representing multiple sub-paths.

22. The computer program product of claim 20, wherein the converting comprises converting the path information into text strings in accordance with an entry format comprising a path identifier and a path node list specifying nodes of a given path, and the single token comprises a reference to a path identifier of another entry.

23. The computer program product of claim 17, wherein the storing comprises isolating semantic units of the generalized DAG in data value nodes, where the nodes of the generalized DAG are DAG nodes that reference the data value nodes, and at least two of the data value nodes are each referenced by more than one DAG node including a DAG node of a second DAG stored in the database.

24. The computer program product of claim 23, wherein the storing comprises representing multiple facets of semantics of a domain as different DAGs, including the generalized DAG and the second DAG.

25. The computer program product of claim 17 wherein the retrieving comprises retrieving inference chains and sub-DAGs using the path table, and the operations further comprise collecting statistical information for the generalized DAG using the adjacency list.

* * * * *

UNITED STATES PATENT AND TRADEMARK OFFICE
CERTIFICATE OF CORRECTION

PATENT NO. : 7,580,918 B2 Page 1 of 1
APPLICATION NO. : 11/433139
DATED : August 25, 2009
INVENTOR(S) : Walter Chang, Nadia Ghamrawi and Arun Swami It is certified that error appears in the above-identified patent and that said Letters Patent is hereby corrected as shown below:

Claim 1:
    column 18, line 30:
        delete "DAG.", and replace with --DAG,--

Claim 12:
    column 19, line 22:
        delete "paths;", and replace with --path;--

Claim 17:
    column 20, line 10:
        after "operations", insert --;--

Claim 17:
    column 20, line 12:
        delete "DAG.", and replace with --DAG,--

Claim 20:
    column 20, line 21:
        delete "claim 19", and replace with --claim 17--

Claim 25:
    column 20, line 44:
        delete "17", and replace with --17,--

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,580,918 B2  Page 1 of 1
APPLICATION NO. : 11/433139
DATED : August 25, 2009
INVENTOR(S) : Chang et al.

It is certified that error appears in the above-identified patent and that said Letters Patent is hereby corrected as shown below:

On the Title page,

Item [*] Notice:   Subject to any disclaimer, the term of this patent is extended or adjusted under 35 U.S.C. 154(b) by 304 days.

Delete the phrase "by 304 days" and insert -- by 410 days --

Signed and Sealed this

Eighteenth Day of May, 2010

David J. Kappos
*Director of the United States Patent and Trademark Office*